US012807787B2

(12) United States Patent
Trenz et al.

(10) Patent No.: US 12,807,787 B2
(45) Date of Patent: Nov. 24, 2026

(54) RECYCLABLE PLASTIC PARTS WITH METALLIC APPEARANCE AND BEING AUTOMATICALLY RECOGNIZABLE BY NIR SPECTROSCOPY AND SORTABLE

(71) Applicant: ECKART GmbH, Hartenstein (DE)

(72) Inventors: Wolfgang Trenz, Pegnitz (DE); Günter Kaupp, Neuhaus (DE); Dietmar Mäder, Rückersdorf (DE)

(73) Assignee: ECKART GmbH, Hartenstein (DE)

( * ) Notice: Subject to any disclaimer, the term of this patent is extended or adjusted under 35 U.S.C. 154(b) by 0 days.

(21) Appl. No.: 19/103,006

(22) PCT Filed: Oct. 10, 2023

(86) PCT No.: PCT/EP2023/077986

§ 371 (c)(1),
(2) Date: Feb. 11, 2025

(87) PCT Pub. No.: WO2024/079087

PCT Pub. Date: Apr. 18, 2024

(65) Prior Publication Data

US 2025/0263536 A1 Aug. 21, 2025

(30) Foreign Application Priority Data

Oct. 14, 2022 (EP) .................................... 22201638

(51) Int. Cl.

*C08K 9/02* (2006.01)
*C08K 7/00* (2006.01)
*B29B 17/02* (2006.01)

(52) U.S. Cl.

CPC .................. *C08K 9/02* (2013.01); *C08K 7/00* (2013.01); *B29B 17/02* (2013.01); *B29B 2017/0279* (2013.01); *C08K 2201/005* (2013.01)

(58) Field of Classification Search

CPC ...... C08K 9/02; C08K 7/00; C08K 2201/005; B29B 17/02; B29B 2017/0279
See application file for complete search history.

(56) References Cited

U.S. PATENT DOCUMENTS

| | | | |
|---|---|---|---|
| 4,623,396 A | 11/1986 | Kimura et al. | |
| 4,948,631 A | 8/1990 | Ostertag et al. | |
| 5,356,471 A | 10/1994 | Reynders | |
| 5,472,491 A | 12/1995 | Duschek et al. | |
| 5,624,487 A | 4/1997 | Schmidt et al. | |
| 5,972,098 A | 10/1999 | Andes et al. | |
| 5,985,020 A | 11/1999 | Andes et al. | |
| 6,176,918 B1 | 1/2001 | Glausch et al. | |
| 6,290,766 B1 | 9/2001 | DeLuca, Jr. et al. | |
| 6,361,593 B2 | 3/2002 | DeLuca, Jr. et al. | |
| 2005/0252416 A1 | 11/2005 | Venturini et al. | |
| 2007/0028799 A1 | 2/2007 | Kneiss et al. | |
| 2007/0199478 A1 | 8/2007 | Schlegl et al. | |
| 2008/0295737 A1* | 12/2008 | Henglein | C09C 1/0015 106/420 |
| 2012/0001521 A1 | 1/2012 | Shiraki et al. | |
| 2012/0236309 A1* | 9/2012 | Krause | G01J 3/463 356/402 |
| 2014/0018439 A1 | 1/2014 | Gruner et al. | |
| 2015/0259536 A1 | 9/2015 | Gruner et al. | |
| 2017/0130054 A1 | 5/2017 | Dietz et al. | |
| 2017/0321057 A1 | 11/2017 | Rueger et al. | |
| 2022/0145082 A1 | 5/2022 | Brendel et al. | |

FOREIGN PATENT DOCUMENTS

| | | |
|---|---|---|
| EP | 0681009 | 4/1995 |
| WO | WO2006021386 | 3/2006 |
| WO | 2020020834 | 1/2020 |

OTHER PUBLICATIONS

International Search Report and Written Opinion for PCT/EP2023/077986.

* cited by examiner

*Primary Examiner* — Nathan L Van Sell

(57) ABSTRACT

Plastic part having a mean thickness $t_{pl}$ containing a mixture of effect pigments comprising flaky aluminum pigments obtained by milling of aluminum or aluminum-based alloy powder in a concentration $c_{Al}$ and silvery, absorbing pearlescent pigments in a concentration $c_P$, wherein i) for flaky aluminium pigments having a $D_{10}\geq 7.0$ µm: $c_{Al}*t_{pl}$ is in a range of 0.0 to 0.20 wt. % cm, or ii) for flaky aluminium pigments having a D10<7.0 µm: $c_{Al}*t_{pl}$ is in a range of 0.0 to 0.036 wt. % cm, wherein each concentration refers in wt. % to the total plastic part.

17 Claims, No Drawings

RECYCLABLE PLASTIC PARTS WITH METALLIC APPEARANCE AND BEING AUTOMATICALLY RECOGNIZABLE BY NIR SPECTROSCOPY AND SORTABLE

The present invention relates to plastics compositions having a metallic effect look and are automatically detectable by their NIR radiation and be sorted automatically for recycling purposes.

Recycling of plastics demands a fast and cost-efficient method of sorting the various plastics from municipal waste. Since about 20 years NIR (Near Infrared) spectroscopy is used in automatically sorting systems. Plastics can be detected by specific vibrations absorption bands in the NIR region.

To embellish the look of plastic articles effect pigments like flaky metal pigments, particularly aluminium effect pigments or pearlescent pigments may be added to the plastic. Usually, the effect pigments are mixed with the thermoplastic melt by an extrusion process. Aluminum pigments add a silvery metallic appearance to the plastic article. As these pigments are opaque to visible wavelength' they exhibit an extremely high hiding power. The plane-parallel orientation of the flaky pigments in a plastic, however, is much less distinct compared to wet-coatings and therefore properties like flip-flop or high gloss as known from wet-coating applications or from printing inks are not as high here.

It has been recognized that the pigmentation of plastics with metal effect pigments diminishes the ability of the plastic material to be detected and identified by means of NIR spectroscopy. Apparently, the high reflection also of infrared rays of aluminum is the reason to this behavior.

WO 2020/208134 A1 discloses an effect pigment mixture of a platy aluminum effect pigment with silvery pearlescent pigments and coating formulations containing this mixture. Applications in plastics are not mentioned therein.

US 2005/0252416 A1 discloses a blend of at least one effect pigment with a small amount of an aluminum metal pigment having a mirror-like appearance. This effect pigment mixture has a high hiding power and applications are focused on coating formulations, especially automotive topcoat compositions. The automized sorting of plastics by NIR spectroscopy is not mentioned therein.

It is therefore an object of this invention to make available an inexpensive plastic part having a metallic effect look like especially a high hiding powder and being capable to be detected reliably in an automized sorting system by NIR spectroscopy.

This object is solved by providing a plastic part having a mean thickness $t_{pl}$ containing a mixture of effect pigments comprising flaky aluminum pigments obtained by milling of aluminum or aluminum-based alloy powder in a concentration $c_{Al}$ and silvery, absorbing pearlescent pigments in a concentration $c_P$, wherein i) for flaky aluminium pigments having a $D_{10} \geq 7.0$ µm: $c_{Al} * t_{pl}$ is in a range of 0.0 to 0.20 wt. % cm, or
ii) for flaky aluminium pigments having a $D_{10} < 7.0$ µm: $c_{Al} * t_{pl}$ is in a range of 0.0 to 0.036 wt. % cm, wherein each concentration refers in wt. % to the total plastic part.

The plastic parts of this invention have a distinct metallic appearance. Such metallic appearance especially refers to opacity, a rather high brightness and a certain metallic flip-flop. Flop and brightness of mass-colored plastics are not as high as obtained from wet-coatings of lacquers or printing inks containing flaky aluminum effect pigments as the orientation of the flakes in a resin is less pronounced, but still they do apply. The plastic parts have a pronounced opacity as aluminum effect pigments are opaque for visible light. Especially IR radiation is reflected almost completely by aluminum which causes the problem of being detected in an automatic sorting device. In such sorting devices the plastic articles are first separated such that they essentially do not overlap and they are transported on a band at high speed. The specific types of plastics are detected by NIR spectrometers in reflection and apparently aluminum flakes increase the reflection but do not allow the IR radiation to penetrate deeply into the plastic part and therefore the IR spectra of the resin are not detected with sufficient intensity and accuracy. The aluminum pigments exhibit a masking effect of the plastic part against IR radiation penetration.

The plastic part can have several forms like e.g. films, foils, bottles, trays, containers, flip-tops, and closures etc., When located on a sorting band the plastic parts will be placed in a somewhat statistical or random manner. The area contacting the band will be a rather large area for static reasons. The thickness perpendicular to the band of such area of the plastic part is the thickness $t_{Pl}$. If this thickness is not uniform a mean thickness may be defined. Should the plastic part be hollow the thickness of the area opposing the contacting area is the part of the plastic which is detected by IR beam and therefore $t_{Pl}$ the mean thickness of this area.

The mean thickness $t_{pl}$ of the plastic part is preferably in a range of 50 µm to 5 mm. The opaqueness of the plastic part depends on the concentration of effect pigments and on the mean thickness $t_{Pl}$. Therefore, based on the Lambert-Beer law the opaqueness may be well represented by the product of the aluminum effect pigment concentration $c_{Al}$ or the pearlescent pigments concentration $c_P$ with the mean thickness $t_{pl}$.

Metal Effect Pigments:

The flaky aluminum pigments can be divided into two categories: a first category of type i) which moderate to low hiding power in a mass-colored plastic and to a type ii) having a high hiding power in a mass-colored plastic. The hiding power of flaky aluminum pigments are mainly determined by their thickness and the particle size distribution. For aluminum pigments obtained by milling these parameters are correlated in the sense that small pigments are usually also thin because of extensive milling.

For the flaky aluminum pigments of type i) the $D_{10} \geq 7.0$ µm.

For the flaky aluminum pigments of type ii) the $D_{10} < 7.0$ µm.

The pigment particle size distribution is typically indicated using D values which denote to quantile values of the volume averaged particle size distribution in frequency representation.

Here, the number indicates the percentage of particles smaller than a specified size contained in a volume-averaged particle size distribution. For example, the $D_{50}$ value indicates the size wherein 50% of the particles are smaller or equal to this value and the $D_{10}$ indicates the size wherein 10% of the particles are smaller or equal to this value. These measurements are conducted e.g. by means of laser granulometry using a particle size analyzer manufactured by Sympatec GmbH (model: Helos/BR). The measurements are conducted according to indications from the manufacturer. The sizes are determined using Fraunhofer approximation and volume averaged equivalent spheres.

The span ΔD is defined by the well-known formula (I)

$$\Delta D=(D_{90}-D_{10})/D_{50} \quad (I)$$

and is a measure of the relative width of a particle size distribution.

One can roughly state, that the effect pigments of type i) are so-called silver dollar aluminum pigments. These effect pigments are obtained by essentially deformation milling of essentially sphere-like aluminium powder.

The aluminum pigments of type ii) are so-called cornflake pigments. They are obtained essentially comminution milling of non-sphere-like aluminium powder. A milling process of aluminum powder under conditions with high energy impact will lead to a large number of small particles by crushing small parts from the edge of a flake and therefore the $D_{10}$ will have rather low values. On the other hand the aluminum particles obtained by milling may be sieved in different manners and therefore also the span of the particle size distribution is important.

In a further embodiment the flaky aluminum pigments of type i) have a 7.0 μm≤$D_{10}$≤22.0 μm and in a preferred further embodiment the flaky aluminum pigments of type i) have a $D_{10}$ value in the range of 7.0 μm to 12.0 μm and even more preferred in a range of 7.0 μm to 10.0 μm. In most cases flaky aluminum pigments with a $D_{10}$ value in a range of 1.0 μm to 22.0 μm do not have the problem of NIR detection of the plastic in automized sorting apparatuses.

In a further embodiment the flaky aluminum pigments of type i) have a span ΔD<1.4.

In a further embodiment the flaky aluminum pigments of type ii) have a $D_{10}$<6.0 μm. Preferably the flaky aluminum pigments of type ii) have a span equal to or larger than 1.20 and more preferably larger than 1.40 and most preferably larger than 1.60.

The product of the concentration of $c_{Al}$ and $t_{pl}$ is for flaky aluminium pigments of type i) is in a range of 0.0 to 0.20 wt. % cm, and for aluminium pigments of type ii) is in a range of 0.0 to 0.030 wt. % cm.

"Flaky aluminum pigments" are used interchangeable to the expression "aluminum effect pigments" within this document.

When the concentrations and are expressed in "%" always "wt. %", referred to the total plastic part is meant in this document, if not indicated otherwise.

Usually the flaky aluminum pigments of type i) exhibit a much lower hiding power compared to flaky aluminum pigments of type ii) and therefore much more aluminum pigments can be used. The type ii) pigments are more sensitive with respect to the masking effect of IR radiation and therefore much lower concentrations are tolerable.

In some embodiments the aluminum effect pigment may be completely exchanged by pearlescent pigments as demonstrated in the experimental section. As aluminum pigments are usually less expensive compared to the silvery, absorbing pearlescent pigments it is, however, preferred to use a certain minimum amount of aluminum pigments. Therefore, in a more preferred embodiments the product of the concentration of the aluminum effect pigments $c_{Al}$ in wt. % and $t_{pl}$ is for flaky aluminium pigments of type i) $c_{Al}$*$t_{pl}$ s in a range of 0.02 to 0.20 wt. % cm, and for aluminium effect pigments of type ii) $c_{Al}$*$t_{pl}$ is in a range of 0.0020 to 0.030 wt. % cm, each concentration referred to the total plastic part.

In further preferred embodiments of the product of the concentration of the flaky aluminum pigments $c_{Al}$ and $t_{pl}$ is for flaky aluminum pigments of type i) are in a range of 0.040 to 0.180 wt. % cm, more further preferred in a range of 0.080 to 0.160 wt. % cm and most preferred in a range of 0.100 to 0.150 wt. % cm.

For the flaky aluminum pigments of type ii) in further preferred embodiments the product of the concentration of the flaky aluminum pigments $c_{Al}$ and $t_{pl}$ is in a range of 0.010 to 0.180 wt. % cm, more further preferred in a range of 0.080 to 0.026 wt. % cm and most preferred in a range of 0.010 to 0.025 wt. % cm.

In these respective concentration regimes an optimum may be achieved with respect to precise sorting properties by NIR detection of the plastic, costs and process stability.

The flaky aluminum pigments contained in the plastic part preferably has a $d_{50}$ in a range of 7.0 to 95.0 μm, more preferably in a range of 8.0 to 40.0 μm and most preferably in a range of 8.5 to 30.0 μm.

The flaky aluminum pigments of type i) preferably have a mean thickness haj in a range of 100 to 350 nm and more preferably in a range of 120 to 300 nm. The flaky aluminum pigments of type ii) preferably have a mean thickness $h_{Al}$ in a range of 80 to 170 nm, more preferably in a range of 85 to 150 nm and most preferably in a range of 90 to <120 nm.

The mean thickness may be determined by SEM based on the procedure described in WO 2004/087816 A2 on page 24, lines 1 to 28 and further detailed in the experimental section.

In further embodiments the flaky aluminum pigment is coated with a metal oxide which is preferably selected from the group consisting of $SiO_2$, Ce-oxide, Mo-oxide, V-oxide, Cr-oxide and mixtures or combinations thereof. Most preferably the aluminium effect pigment is coated with $SiO_2$. The coatings with such metal oxides impart mechanical stability to the aluminum pigment and improve their corrosion stability against humidity or other chemicals and weather stability.

Silvery Absorbing Pearlescent Pigments:

The pearlescent pigments used in the effect pigment mixture of the plastic parts are silvery, absorbing pearlescent pigments with optical properties reflecting a metallic look. These pearlescent pigments usually have optical properties such that the resulting color in reflection is essentially a neutral silver tone or a slightly colored tone and cover a region from absorbing grey to anthracite shades. With respect to pearlescent pigments generally the color tone "anthracite" is also often referred to as "black". In this invention the term "silvery, absorbing pearlescent pigments" is used for pearlescent pigments which have a combination of neutral silver or slightly colored reflection color and grey to anthracite absorption color tones providing a metallic-like characteristic.

In preferred embodiments the silvery, absorbing pearlescent pigments are selected from the following types:

a) pearlescent pigments comprising a transparent substrate which is coated with a high-refractive index layer with n>1.8, which comprises or consists of an iron-oxide with Fe(II)-ions, b) pearlescent pigments comprising a transparent substrate which is coated with a high-refractive index layer with n>1.8, which comprises or consists of titanium suboxide or a pearlescent pigment comprising a substrate with a high-refractive index with n>1.8 layer, which comprises or consists of a titanium suboxide that is optionally coated with a high-refractive index layer with n>1.8, c) pearlescent pigments comprising a transparent substrate which is coated with a high-refractive index layer with n>1.8, which comprises or consists of titanium oxynitride, d) pearlescent pigments comprising a transparent substrate which is coated with a layer comprising carbon, wherein the carbon is enclosed in a particulate form in another metal oxide layer or is formed as a separate, individual layer, e) a transparent substrate coated with a first layer comprising or consisting of a mixture of the oxides of titanium, iron and at least one of cobalt and chromium and a second layer on the first layer, wherein the second layer comprises an oxide of titanium, and mixtures or combinations of the pearlescent pigments a) to e) or pearlescent pigments with mixtures or combinations of the various coating layers mentioned in the pearlescent pigments a) to e).

The optical properties of the silvery, absorbing pearlescent pigments useable for the effect pigment mixture can be evaluated by making a drawdown of a colorless lacquer (preferably BASF farblos ZM 26-3025) with a pigmentation height of 10 wt. % of the pearlescent pigment using a 100 μm doctor 25 blade on a black/white cartoon paper. The total content of non-volatile components in the lacquer should be 30 wt. %. The optical properties of the dried drawdowns are measured with a BYK-Mac instrument. Preferably, the chroma $C^*_{15°}$ of such a drawdown of the silvery pearlescent pigments measured on black background is ≤15, more preferably ≤14 and most preferably ≤10. The hiding power of the silvery pearlescent pigment in such drawdowns can be defined as the ratio of the $L^*_{75°,black}/L^*_{75°,white}$-values measured on the black to white background, respectively. This ratio is preferably higher than 70%. This high hiding power is mainly achieved by the absorbing layer of the pearlescent pigments. The lightness is represented by the $L^*_{15°}$ value which is close to the angle of reflection and preferably this value measured on the drawdowns on black background is above 90 and more preferably above 100 for the pearlescent pigments of the effect pigment mixture in this particular application.

In a first preferred embodiment a) the silvery pearlescent pigments used in the effect pigment mixture are pearlescent pigments comprising a transparent substrate which is coated with a high-refractive index layer with n>1.8, which comprises or consists of an iron-oxide with Fe(II)-ions. In a further preferred embodiment the silvery pearlescent pigment a) has a coating comprising a metal oxide layer comprising Ti and Fe, wherein the iron is mainly Fe(II) ions, which is preferably an ilmenite ($FeTiO_3$) layer or a magnetite ($Fe_3O_4$) layer or mixtures thereof. In a further preferred embodiment the pearlescent pigment has a coating comprising a first layer of $TiO_2$ followed by a metal oxide layer containing Fe(II)-ions, preferably consisting of ilmenite. Pearlescent pigments with a coating comprising a homogeneously distributed ilmenite ($FeTiO_3$) have been described in EP 1620511 A2. Pearlescent pigments with a coating comprising first a $TiO_2$ layer followed by an inhomogeneously distributed ilmenite layer have been described in WO 2012/130776 A1. Further examples of such pearlescent pigments are disclosed in EP 246523 A2, EP 3119840 A1 (with an $Al_2O_3$ substrate) or EP 681009 A2 (with a further high-refractive index coating). Pearlescent pigments with a single layer of ilmenite on a $TiO_2$ platelet substrate have been described in WO 1997/043348 A1. The thicknesses of the layers disclosed in these documents need to be reduced in order to achieve the silvery to grey shaded pearlescent pigments in reflection as demanded in the effect pigment mixture.

In further preferred embodiments the silvery pearlescent pigment comprises the following structure: (a1) a transparent platelet-shaped synthetic substrate, (a2) a titanium oxide layer, followed by (a3) a metal oxide layer comprising Ti- and Fe-ions, wherein the Fe-ions are mainly Fe(II)-ions. In a further preferred embodiment the silvery pearlescent pigment has a layer of ilmenite ($FeTiO_3$). In further preferred embodiments the pearlescent pigment has an iron(III) oxide content of less than 0.5% by weight, based on the total weight of the pigment. All other amounts of Fe-ions in iron oxides are in the reduced Fe(II) oxidation state. A higher amount of remaining Fe(III)-ions would lead to an undesired brownish absorption color. The amounts of Fe(II) or Fe(III) can be determined with Mößbauer spectroscopy or with XPS analysis, possibly combined with sputter profiles. In further embodiments the total amount of iron compounds, calculated as elemental iron, in the silvery, absorbing pearlescent pigment according to the invention is less than 5.0% by weight, preferably in a range from 1% by weight to 4.3% by weight, particularly preferably in a range from 1.4% by weight to 2.9% by weight and very particularly preferably in a range from 1.5% by weight to 2.3% by weight, based in each case on the total weight of the pearlescent pigment. With such low amounts of Fe a silvery color can be well developed. Higher amounts than 15 wt. % lead to pearlescent pigments with a too strong absorption color. In further preferred embodiments the pearlescent pigment of type a) has an iron/titanium weight ratio as a function of the coating, in accordance with formula (II):

$$\frac{\text{Iron content } (wt.\ \%)}{\text{Titanium content } (wt.\ \%)} * \text{Fraction of the coating } (wt.\ \%) \qquad \text{(II)}$$

is in a range from 1.0 to 25.0. Herein "iron content" stands for the amount of iron compounds, calculated as elemental iron, and "titanium content" stands for the amount of titanium compounds, calculated as elemental titanium, in each case in the pearlescent pigment and based on the total weight of the pearlescent pigment, and where the "fraction of the coating (% by weight)" stands for the weight fraction, based on the total weight of the pearlescent pigment, of the overall coating applied to the substrate. In other embodiments this parameter is in a range from 1.2 to 8.0, preferably in a range from 2.0 to 7.5, particularly preferably in a range from 2.5 to 7.0, and very particularly preferably in a range from 3.0 to 6.0. This parameter especially ensures that the pearlescent pigment has a silvery color as demanded in the effect pigment mixture.

In another embodiment b) the silvery, absorbing pearlescent pigments comprise a transparent substrate which is coated with a high-refractive index layer with n>1.8 which comprises or consists of a titanium suboxide or a substrate with a high-refractive index n>1.8 layer comprising or consisting of a titanium suboxide that is optionally coated with a high-refractive index layer with n>1.8. The high-refractive coating layer with n>1.8 of the second kind of pigment is made from a different material than the substrate's titanium suboxide and is preferably $TiO_2$. The coated titanium suboxide layer or the titanium suboxide substrate denote to titanium oxides wherein the formal oxidation number of titanium is below 4. They can be represented by the formula:

$$Ti_nO_{2n-1} \qquad \text{(III)}$$

wherein n in an integer of 1 to 100, preferably n=1 to 10.

Typical examples of such compounds are TiO, $Ti_2O_3$, $Ti_3O_5$, $Ti_4O_7$. Mixtures of any such species may be also included. In further embodiments the titanium suboxide content can be less than 5% based on the total pigment and the main component of said titanium suboxide is $Ti_2O_3$. An example of a commercially available pearlescent pigment with titanium suboxide is Iriodin® 9605 (Merck).

In another embodiment c) the silvery pearlescent pigments comprise a transparent substrate which is coated with a high-refractive index layer with n>1.8, which comprises or consists of titanium oxynitride. The titanium oxynitrides can be expressed by the general formula:

$$Ti_xN_yO_z \quad (IV)$$

wherein x is 0.2 to 0.6, y is 0.05 to 0.6 and z is 0.1 to 0.9, which comprises a solid solution of 25 nitrogen in titanium monoxide. Such pearlescent pigments have been described in U.S. Pat. No. 4,623,396 A. Pearlescent pigments with intense blue color or a bluish fade have been described in EP 332071 A1 or in EP 735115 A1. Herein a first $TiO_2$ layer is reduced with ammonia at temperatures in the range of 750° C. to 850° C. If the optical thickness of the $TiO_2$ layer deposited in a first step is in the range of 50 to 30 100 nm silvery effect pigments are obtained. In EP 842229 B1 pearlescent pigments are described were a flaky $TiO_2$ substrate is first formed by solidification of a hydrolysable aqueous solution of a titanium compound on an endless band. These substrates can be coated with further $TiO_2$ or other metal oxides and calcined under reducing conditions.

Examples of such pearlescent pigments are Paliocrom Blausilber L6000 and L6001, which have been earlier manufactured by BASF Colors and Effects GmbH.

In a further embodiment d) the pearlescent pigment of the effect pigment mixture comprises a transparent substrate which is coated with a layer comprising carbon, wherein the carbon is enclosed in a particulate form in another metal oxide layer or is formed as a separate, individual layer on at least one high-refractive index layer. In DE 4227082 A1 pearlescent pigments were disclosed, wherein pearlescent substrates or $TiO_2$ coated pearlescent pigments were coated with organofunctional silanes and calcined or pyrolyzed under inert gas atmosphere yielding a pearlescent pigment containing carbon in silica matrix and having a darker color. Similar pearlescent pigments were disclosed in DE 4227082 A1. In EP 3230384 A1 a pearlescent pigment with metallic silvery look was disclosed where on top of a high-refractive index coating like $TiO_2$ a very thin pure carbon layer is coated via a fluidized bed apparatus.

In a further embodiment e) the pearlescent pigment of the effect pigment mixture comprises a transparent substrate platelet coated with a first layer comprising or consisting of a mixture of the oxides of titanium, iron and at least one of cobalt and chromium and a second layer on the first layer, wherein the second layer comprises an oxide of titanium. Such pearlescent pigments have a black absorption color and are described in U.S. Pat. No. 6,361,593 B2 and U.S. Pat. No. 6,290,766 B1. Commercially available Products are Vegetable Black Olive (Sun Colors and Effects).

In further embodiments mixtures or combinations of the pearlescent pigments a) to e) itself or pearlescent pigments with mixtures or combinations of the various coating layers mentioned in the pearlescent pigments a) to e) can be used. For example, pearlescent pigments comprising a coating of mixtures or combinations of titanium suboxide and titanium oxynitride may be used.

In preferred embodiments the silvery, absorbing pearlescent pigments are taken from the following group:

a) pearlescent pigments of type a), wherein the pearlescent pigment has a coating comprising a metal oxide layer comprising Ti- and Fe-ions, wherein the Fe-ions are mainly Fe(II) ions, which is preferably an ilmenite ($FeTiO_3$) layer, magnetite ($Fe_3O_4$) or mixtures thereof or b) pearlescent pigments of type b), wherein the titanium suboxide can be represented by the formula $Ti_nO_{2n-1}$ (IV) wherein n in an integer of 1 to 10, or c) pearlescent pigments of type c), wherein the titanium oxynitride can be represented by the formula $Ti_xN_yO_z$ (V) wherein x is 0.2 to 0.6, y is 0.05 to 0.6 and z is 0.1 to 0.9, which comprises a solid solution of nitrogen in titanium monoxide, and mixtures or combinations of the pearlescent pigments a) to c) or pearlescent pigments with mixtures or combinations of the various coating layers mentioned in the pearlescent pigments a) to c).

The transparent substrates used for all variants of the silvery, absorbing pearlescent pigments are typically natural or synthetic mica, glass flakes, $SiO_2$-flakes, $Al_2O_3$-flakes or mixtures thereof. Preferred substrates are glass flakes, natural synthetic mica as these substrates provide pearlescent pigments with pure silvery color tones and high gloss. Furthermore, the more expensive substrates $SiO_2$ or $Al_2O_3$ are rarely used in plastic industry as they are the costliest ones. Especially $Al_2O_3$ substrates may have further disadvantages in the sense that pearlescent pigments which are mass-molded into a plastic, for example by extrusion exhibit strong shear forces which peel off part of the coating of high-refractive index layers. Due to its high hardness the thus exposed $Al_2O_3$ flakes can act as undesired abrasion aid which may impart an unpleasant touch feeling.

The high-refractive index layers of the silvery pearlescent pigments of type a), b) or c) preferably have an index of refraction n of >2.0 and more preferably n>2.3.

In preferred embodiments the silvery pearlescent pigments according to the invention may be provided with at least one external protective layer. This protective layer further enhances the light stability, weather stability and/or chemical stability of the pearlescent pigment. Especially the photoactivity of any $TiO_2$ layers and the concomitant destroying of organic resins in coatings may be effectively reduced by these protective layers. The external protective layer of the silver-colored pigments according to the invention can comprise, or preferably consist of, one or two metal oxide layers and/or metal hydroxide layers and/or metal oxide hydrate layers of the elements Si, Al, Zr or Ce. In one variant, a silicon oxide layer, preferably $SiO_2$ layer, is applied as the outermost metal oxide layer.

After these protective layer organofunctional coupling agents may be coated on the outermost protective layer as described above in the section dealing with aluminum effect pigments. In principle, the same kind of organofunctional coupling agents can be used as well for the silvery pearlescent pigments. Such weather stable external protective layer are described in EP 0 888 410 B1, EP 0 632 109 10 A1, EP 1727864 B1, EP 1 682 622 B1, EP 2691478 B1 or EP 2904052 B1, for example.

As the silvery, absorbing pearlescent pigments itself do not affect the detection and identification of the of the plastic parts in automated sorting devices and, on the other hand, have a rather metallic look with a high hiding power compared to conventional pearlescent pigments they can surprisingly replace at least part of the flaky aluminum pigments in a plastic part. The improve the flop and their use open up a great process stability for the automated sorting of plastic parts with metallic look.

The silvery, absorbing pearlescent pigments are preferably used together with flaky aluminum pigments in such amounts that $c_P$*$c_{Pl}$ is in a range of 0.020 to 0.400 cm wt. %, more preferred in a range of 0.030 to 0.300 cm wt. % and most preferred in a range of 0.040 to 0.240 cm wt. %. Within these ranges the concentrations of pearlescent pigments are relatively low and inexpensive plastic parts with a great variability of processing with respect to their sorting behavior can be provided.

For embodiments without flaky aluminum pigments the concentrations of pearlescent pigments should be chosen such that $c_P$*$c_{Pl}$ is in a range of 0.140 to 2.000 cm wt. %, more preferred in a range of 0.150 to 0.600 cm wt. % and most preferred in a range of 0.160 to 0.300 cm wt. %.

Plastic Parts:

The plastic material for the plastic parts is preferably selected from the group consisting of polypropylene (PP high density polyethylene (HDPE), low-density polyethylene (LDPE), linear low-density polyethylene (LLDPE), polyethylene terephthalate (PET), polystyrene (PS), polyurethane (PUR), polyacrylate, polyamide (PA) or nylons, polyvinylchloride (PVC), polycarbonate (PC) and ABS/MABS.

Examples for nylons are PA6 (nylon 6), PA66 (nylon 6/6), PA12 nylon 12, PA11 (nylon 11) (PA), PA 69 (nylon 6/9), PA610 (nylon 6/10), PA612 (nylon 6/12) PA46 (nylon 46), PA6, PA66, PA610, PA11, PA12, PA1010, PA612 and PA46.

Examples for aromatic polyamides are, PAST, PA9T, for semi-aromatic polyamides are PA6T/6, PA6T/66, PA9T, and for polyphthalamides is PA6T/61.

These kinds of polymers are widely used in the plastic industry and are automatically detectable and sortable using NIR spectroscopy. Most preferred are polypropylene, polyethylene, polystyrene and polyethylene terephthalate.

The plastic part is most preferably opaque for visible light. In preferred embodiments, the optical density OD of the plastic part is >1.5 when measured along the mean thickness $t_{pl}$ as defined above In certain embodiments the metallic pigments can be completely resigned ($c_{Al}$*$t_{Pl}$=0.000%). For this case I the product of $t_{Pl}$ with the concentration of silvery, absorbing pearlescent pigment $c_P$ is preferably 0.40 cm wt. %≤$c_P$*$t_{pl}$<about 2.0 cm wt. % and more preferably %, 0.40 cm wt. %≤$c_P$*$t_{pl}$<about 2.0 cm wt. %.

As these embodiments might be more costly, it is preferred to use flaky aluminum pigments in the plastic parts. When differentiating certain ranges of the product of $t_{Pl}$ with $c_{Al}$ the following ranges of $t_{Pl}$*$c_p$ for the silvery, absorbing pearlescent pigments are preferred:

II. for the aluminium effect pigments being of type i):

$$0.020 \text{ cm } wt.\ \% \leq c_{Al} * t_{pl} \leq 0.050 \text{ cm } wt.\ \%, \qquad \alpha)$$

$$0.100 \text{ cm } wt.\ \% \leq c_P * t_{pl} \leq \text{about } 1.000 \text{ cm } wt.\ \%,$$

$$0.05 \text{ cm } wt.\ \% < c_{Al} * t_{pl} \leq 0.10 \text{ cm } wt.\ \%, \qquad \beta)$$

$$0.050 \text{ cm } wt \leq c_P * t_{pl} \leq \text{about } 1.0 \text{ cm } wt.\ \%,$$

$$0.10 \text{ cm } wt.\ \% < c_{Al} * t_{pl} \leq 0.20 \text{ cm } wt.\ \%, \qquad \gamma)$$

$$0.02 \text{ cm } wt.\ \% < c_P * t_{pl} \leq \text{about } 0.80 \text{ cm } wt.\ \%,$$

or

III. for the aluminium effect pigments being of type ii):

$$0.002 \text{ cm } wt.\ \% \leq c_{Al} * t_{pl} \leq 0.020 \text{ cm } wt.\ \%, \qquad \delta)$$

$$0.10 \text{ cm } wt.\ \% \leq c_P * t_{pl} \leq \text{about } 0.80 \text{ cm } wt.\ \%,$$

$$0.020 \text{ cm } wt.\ \% < c_{Al} * t_{pl} \leq 0.030 \text{ cm } wt.\ \%, \qquad \varepsilon)$$

$$0.020 \text{ cm } wt \leq c_P * t_{pl} \leq \text{about } 0.30 \text{ cm } wt.\ \%.$$

Especially when using flaky aluminum pigments of type ii) which have a great impact on the sorting behavior the amount of silvery, absorbing pearlescent pigments may be carefully adjusted to the (low) concentrations of the flaky metal pigments in order not to risk an insufficient sorting behavior. Already rather small additions of silvery, absorbing pearlescent pigments can improve the flop. In case of flaky aluminum pigments of type ii) (cornflake type) the addition of pearlescent pigments also improve the brightness of the plastic part.

In further embodiments of the plastic parts predetermined ranges of the product of $t_{Pl}$ with $c_{Al}$ impart the following ranges of the product of $t_{Pl}$ with $c_p$ for the silvery, absorbing pearlescent pigments:

II. for the aluminium effect pigments being of type i):

$$0.04 \text{ cm } wt.\ \% \leq c_{Al} * t_{pl} \leq 0.05 \text{ cm } wt.\ \%, \qquad \alpha)$$

$$0.30 \text{ cm } wt.\ \% \leq c_P * t_{pl} \leq \text{about } 1.0 \text{ cm } wt.\ \%,$$

$$0.06 \text{ cm } wt.\ \% < c_{Al} * t_{pl} \leq 0.10 \text{ cm } wt.\ \%, \qquad \beta)$$

$$0.050 \text{ cm } wt \leq c_P * t_{pl} \leq \text{about } 0.80 \text{ cm } wt.\ \%,$$

$$0.10 \text{ cm } wt.\ \% < c_{Al} * t_{pl} \leq 0.20 \text{ cm } wt.\ \%, \qquad \gamma)$$

$$0.02 \text{ cm } wt.\ \% < c_P * t_{pl} \leq \text{about } 0.70 \text{ cm } wt.\ \%,$$

or

III. for the aluminium effect pigments being of type ii):

$$0.04 \text{ cm } wt.\ \% \leq c_{Al} * t_{pl} \leq 0.020 \text{ cm } wt.\ \%, \qquad \delta)$$

$$0.12 \text{ cm } wt.\ \% \leq c_P * t_{pl} \leq \text{about } 0.80 \text{ cm } wt.\ \%,$$

$$0.020 \text{ cm } wt.\ \% < c_{Al} * t_{pl} \leq 0.030 \text{ cm } wt.\ \%, \qquad \varepsilon)$$

$$0.080 \text{ cm } wt \leq c_P * t_{pl} \leq \text{about } 0.260 \text{ cm } wt.\ \%.$$

The plastic parts comprising the effect pigment mixture can further contain at least one of additives, UV absorbers, antioxidants, fillers, conventional color pigments and additional pearlescent pigments, which are no silvery absorbing pearlescent pigments.

As conventional pigments inorganic or organic pigments can be used. With conventional pigments it is meant that these pigments do not have an angle dependency (either the angle of incidence or of observation) in their optical properties which is just contrary to effect pigments.

These conventional pigments are used to impart color to the Resin mold, if demanded. The conventional pigment may be an organic pigment, an inorganic pigment or a mixture thereof.

Accordingly, in a preferred aspect, the conventional pigment is a transparent pigment, especially selected from the group consisting of an organic pigment, an inorganic pigment or a mixture thereof.

Organic colored absorption pigments suitable for the present coating formulation include, for example, a pigment selected from the group consisting of a monoazo, disazo, disazo condensation, anthanthrone, anthraquinone, anthrapyrimidine, benzimidazolone, quinacridone, quinophthalone, diketopyrrolopyrrole, dithioketopyrrolopyrrole, dioxazine, flavanthrone, isoindoline, isoindolinone, isoviolanthrone, metal complex, perinone, perylene, pyranthrone, pyrazoloquinazolone, indigo, thioindigo, triarylcarbonium pigment and a mixture thereof.

In further embodiments the coating formulation contains additional pearlescent pigments. The additional pearlescent pigments are none of the ones used in the effect pigment mixture described above. The additional pearlescent pigments are characterized therein, that they are based on a transparent substrate and the layers contributing to the color consist of one or two high-refractive index layers consisting of $TiO_2$, $Fe_2O_3$ or mixtures thereof, and optionally one or more low refractive layers with $n<1.8$.

Preferably, these additional pearlescent pigments have one layer consisting of $TiO_2$ or $Fe_2O_3$, most preferably one layer consisting of $TiO_2$. "Consisting of $TiO_2$" means in this case, that small amounts of $SnO_2$ may be present which may have been used to reutilize the $TiO_2$ in well-known manner.

These additional pearlescent pigments do have mainly coloristic properties. They may be used to adjust color tones or to improve the flop. Usually they do not have the opacity and the metallic appearance of the pearlescent pigments used for claim 1 of the plastic part containing the therein claimed effect pigment mixture.

It is preferred that the total amount of the effect pigments of the effect pigment mixture, optionally additional pearlescent pigments and optionally additional conventional pigments is equal to or less than 10.0 wt. %, based on the plastic part, more preferably is in a range of 0.200 to 6.000 wt. %, and most preferred in a range of 1.500 to 4.000 wt. %, based on the total amount of the plastic part.

Above 10 wt. % the effect pigment and optionally conventional pigments the mechanical properties of the plastic parts are strongly affected adversely such as tensile strength, elongation at break, impact strength, etc.

The plastic parts of this invention are typically used in applications such as electrical & electronic equipment's, computers, communication & consumer electronics (3C), household & home appliances, lifestyle articles, construction & building industry, sports & leisure goods, consumer goods, foils & films, automotive applications, cosmetic & food packaging, toys and so-called flip-tops.

The plastic parts containing the effect pigments are typically manufactured by methods such as extrusion, calendaring, cast-film, blown-film, blow molding, roto molding, injection molding, injection blow molding, injection stretch blow molding (ISBM)) for containers and packaging, preform stretch blow molding (SBM), pressing, thermoforming, fused deposition modeling (FDM) or fused filament fabrication (FFF), fluidized bed coating, and laser sintering.

Use and Method of the Sorting of Plastic Parts by NIR Spectroscopy

A further embodiment is directed to a method of separation of waste plastic parts comprising the steps of:

a) automatically identifying the nature of a certain plastic part according to this invention in a waste mixture of plastics by NIR spectroscopy and
b) separating the certain detected piece of plastic, which had been identified in step a) from the waste.

The waste mixture is transported on a band at velocities of several m/s. Previous to these steps the plastic waste is preferably separated in a sorting device such that each plastic part lying on the transportation band is not covered by another piece. Prior to this separation method there are usually other steps involved like particle size separation of the waste pieces or magnetically separation of magnetic waste pieces like tinplate. The detected NIR signals are processed by a software which compares the spectra using a database to identify the plastic of a certain piece of waste and then activating compressed air nozzles in order to separate the identified plastic part from the band. In this way different kinds of plastics are separated successively. The detection of a certain plastics is usually made according to characteristic vibration bands in the spectral region of about 760 to 2500 nm.

A further embodiment is directed to the use of the plastic part in a method of separation of waste plastics comprising the steps of:

a) automatically identifying the nature of plastic in a waste mixture by IR spectroscopy and
b) separating a detected piece of plastic according to the plastic parts of this invention, which had been identified in step a) from the waste.

EXAMPLES

A Manufacture of Samples:

Several samples were prepared by extruding masterbatches of metal effect pigments (comparative examples) or absorbing, silvery pearlescent pigments or mixtures thereof in varying concentrations with polypropylene. As aluminum effect pigments a commercially available silver dollar pigment (originally Metalux (abbrev. MEX) 2156, Eckart GmbH) and a commercially available cornflake type (STAPA WM Chromal V/80, Eckart GmbH) were used. The silver dollar pigment paste was first pelletized with a polyolefin to a pellet with 80 wt. % metal pigment and 20 wt. % of the binder (commercially available as MASTERSAFE MP 16-20B, Eckart GmbH). In all references to the pure aluminum pigments these types are abbreviated "2156" and "Chromal V" hereinafter. As silvery, absorbing pearlescent pigments the commercially available products Symic C604, Symic B604 and Symic A 604 (all from Eckart GmbH) were used. These pearlescent pigments were based on synthetic mica and had a coating of $TiO_2$ and $Fe_2O_3$ which were calcined under reducing conditions forming a mixed oxide of $TiO_2$ and Fe-oxide which includes Fe(II) ions.

The effect pigments were mixed with polypropylene and extruded to form a masterbatch of 10 wt. % effect pigment concentration. To produce the respective masterbatches of these effect pigments, the process was as follows:

a) Pigments in powder form (pearlescent pigments): 870 g of polypropylene (PP; polypropylene R7051-10N BR, from Braskem, Brazil) in granular form and 100 g of the respective powdered pearlescent pigment, were mixed in a tumbling mixer and then processed to form a granular material in a twin-screw extruder (from Labtech, Bangkok; diameter 20 mm, 28 L/D) at a processing temperature of approx. 230° C.

b) Pigment in paste form (STAPA WM Chromal V/80): 845 g of the polypropylene in granular form, 125 g of STAPA WM Chromal V/80 (a medical white oil paste with a pigment content of 80 wt. %, relative to the total weight of the paste) were mixed in a tumbling mixer and then processed to form a granular material in a twin-screw extruder (from Labtech, Bangkok; diameter 20 mm, 28 L/D) at a processing temperature of approx. 230° C.

c) Pigment in pellet form (MASTERSAFE MP 16-20B): 845 g of polypropylene in granular form and 125 g of MASTERSAFE MP 16-20B (with a pigment content of 80 wt. %, relative to the total weight of the pellet) were mixed in a tumbling mixer and then processed to form a granular material in a twin-screw extruder (from Labtech, Bangkok; diameter 20 mm, 28 L/D) at a processing temperature of approx. 230° C.

The thus obtained masterbatch granular materials were further diluted with the polypropylene to the desired final pigment contents relative to the proportion by weight of the plate. The final concentrations of the effect pigments are depicted in tables 2 (pure effect pigments) and table 3 (effect pigment mixtures). These masterbatch granular materials were then processed to form plates with a surface area of 100 mm×70 mm and a thickness of 2 mm by means of the injection-molding machine (Arburg 221 K-75-250) at a processing temperature of 250° C.

A1 Evaluation of Pure Effect Pigments:

Comparative Example series 1: Various concentrations of Metalux 2156 (processed as Mastersafe mp 16-20b) without pearlescent pigments. This aluminium effect pigment is of "silver dollar" type. Its particle size parameters as measured with a Helios/BR are: $D_{10}$:9.6 μm, $D_{50}$=18.0 μm and $D_{90}$=28.8 μm.

Comparative Example series 2: Various concentrations of STAPA WM Chromal V/80 without pearlescent pigments. This aluminium effect pigment is of "cornflake" type. Its particle size parameters as measured with a Helios/BR are: $D_{10}$:4.3 μm, $D_{50}$=14.8 μm and $D_{90}$=33.0 μm.

Example series 3: Various concentrations of Symic C604. This is a silvery absorbing pearlescent pigment comprising a high-refractive index layer comprising Fe(II)-ions. The median particle size $d_{50,p}$ is 22 μm.

Example series 4: Various concentrations of Symic B604. This is a silvery absorbing pearlescent pigment comprising a high-refractive index layer comprising Fe(II)-ions. The median particle size $d_{50,p}$ is 14 μm.

Example series 5: Various concentrations of Symic A604. This is a silvery absorbing pearlescent pigment comprising a high-refractive index layer comprising Fe(II)-ions. The median particle size $d_{50,p}$ is 9.5 μm.

A2Evaluation of Effect Pigment Mixtures:

Examples series 6: Mixtures of MASTERSAFE MP 16-20B with aluminum pigment content of 1.00% and various amounts of Symic B604.

Examples series 7: Mixtures of MASTERSAFE MP 16-20B with aluminum pigment content of 0.25% and various amounts of Symic B604.

Examples series 8: Mixtures of MASTERSAFE MP 16-20B with aluminum pigment content of 0.50% and various amounts of Symic B604.

Examples series 9: Mixtures of STAPA WM Chromal V/80 with 0.1% aluminum pigment content various amounts of Symic A604.

Examples series 10: Mixtures of STAPA WM Chromal V/80 with 0.15% aluminum pigment content and various amounts of Symic A604.

B Pigment Characterization and Testing Methods:

B1 Determination of average thickness of aluminum effect pigments by SEM:

The aluminum pigments were originally present in the form of a paste and were each first washed with acetone and then dried.

The aluminum powder than was poured onto a conductive adhesive label (Spectro tabs from Plano GmbH, Germany). By this procedure, a certain amount of the flaky aluminium pigments become fixed into an upright position. Under the SEM these particles can be well identified and their thickness at the pigments edge was determined. For each sample 100 particles were counted and the average thickness tai was determined.

B2: The specific surface was measured with the BET method using a three-point method.

B3: Particles size distribution measurements:

These measurements are conducted e.g. by means of laser granulometry using a particle size analyzer manufactured by Sympatec GmbH (model: Helos/BR). The measurements are conducted according to data from the manufacturer. With this apparatus powdered samples as well as pastes can be measured.

Table 2 summarises the different samples with respect to the effect pigments used and the respective concentrations.

Rectangular test sheets having a length of 100 mm, a width of 70 mm and a thickness of 2.0 mm were obtained.

B4: The optical densities of these test sheets were determined using a SW-densitometer (Heiland electronic GmbH TRD 2, Wetzlar, Germany) using a blend with diameter of 3 mm. This apparatus can measure the optical density until a maximum value of 5.5 log*D in transmission mode. After this value, a saturation region is reached (overload).

B5: L*-values were measured at different angles of observation (−15°, 15°, 25°, 45°, 75° and 110°) using a Byk-Mac in the CILAB system. The conditions used were D65 (light source) and 10° for the standard photometric observer; the angle of incidence was 45°. $L^*_{15°}$ was used as measure of the brightness and the flop was calculated to the well-known formula (V):

$$\text{Flop} = 2.69 \times \frac{(L^*_{15°} - L^*_{110°})^{1.11}}{L^{*0.86}_{45°}} \tag{V}$$

Underearth of the sample plates black and white papers were deposited and the L*-values were measured. For the ratio $L^*_{10°,black}/L^*_{110°,white}$ it was found that the OD was at 1.5 if this ratio was less than 1%.

B6: Furthermore the NIR separating behavior of the samples was evaluated by the following tests developed and conducted by cyclos-HTP for the NIR detection and sorting performance of packaging samples.

The test equipment was a setup by Steinert UniSort (Germany) and included a high-resolution operational NIR camera with a full-spectral analysis. The samples were placed on an accelerator belt with 1 m width and a speed of 2.5 m/s. This accelerator belt passed a valve block with 13 mm nozzle distance and 7 bar air pressure and included nineteen operational classifiers. The measured data were read out by a software and visualized for the NIR image. Each kind of detectable plastic was highlighted by a predetermined color.

1.2 Sample Preparation:

For a statistical evaluation of measurable surfaces the probability of different positions) of the samples were evaluated.

Also all relevant components of the test samples were evaluated.

As specimen size 10 pieces per article were used.

1.3 NIR-Spectrometric Measurement Details and Assessment:

Test 1: Identification of the Structure

1. A sample scan was conducted including the NIR-spectrometric detail imaging and a visual evaluation of the detected materials at 0.5 m/s in reflection.
2. Recording of results (intensity image, classification image, result image)
3. Evaluation/plausibility check of images (repeat, if necessary)
4. Expert evaluation of the test result This first test was passed when at least 90% of the pixels generated from the sample were attributable to a certain kind of plastic.

Test 2: Practical Transfer and Testing of the Discharge Behavior:

1. Verification test with operational classifier
2. Determination of the discharge behavior with a minimum of 10 trials of each sample at 2.5 m/s were evaluated.
3. Evaluation of NIR results:

The sorting test was passed when the discharge behavior is ≥80%.

A limited sorting behavior is attributed to a discharge behavior of >30% to <80% (test failed) and the sorting test is definitely failed when the discharge behavior is ≤30%.

Results:

In table 1 the results characterizing the metal effect pigments are summarized:

| Sample | $D_{10}$ [μm] | $D_{50}$ [μm] | $D_{90}$ [μm] | Span ΔD [μm] | Average thickness [nm] | BET [$m^2$/g] | Aspect ratio |
|---|---|---|---|---|---|---|---|
| 2156 | 9.5 | 19.3 | 33.9 | 1.3 | 254 | 2.8 | 76 |
| Chromal V | 4.3 | 14.8 | 33.0 | 1.9 | 100 | 7.3 | 148 |

2156 clearly belongs to type i) of aluminum pigments while Chromal V belongs to type ii).

TABLE 2

Results for the Experiments of pure effect pigment samples

| Sample | Metal pigment | Pearl-escent pigment | Concen-tration Effect pigm. [wt. %] | Fraction of pixels PP in % (test 1) | Automatic Sorting discharge behavior (test 2) | OD |
|---|---|---|---|---|---|---|
| Comp. Ex. 1a | 2156 | — | 0.25% | 99% | ≥80% | 1.6 |
| Comp. Ex. 1b | | | 0.5% | 97% | ≥80% | 3.2 |
| Comp. Ex. 1c | | | 0.75% | 97% | ≥80% | 4.5 |
| Comp. Ex. 1d | | | 1.0% | 96% | ≥80% | 5.3 |
| Comp. Ex. 1e | | | 1.25% | 84% | >30% to <80% | 5.5 |
| Comp. Ex. 1f | | | 1.50% | 70% | <30% | 5.5 |
| Comp. Ex. 2a | Chromal V | — | 0.10% | 98% | ≥80% | 2.6 |
| Comp. Ex. 2b | | | 0.15% | 94% | ≥80% | 4.0 |
| Comp. Ex. 2c | | | 0.20% | 95% | <30% | 4.9 |
| Comp. Ex. 2d | | | 0.25% | 47% | <30% | 5.5 |
| Comp. Ex. 2e | | | 0.30% | 51% | <30% | 5.5 |
| Comp. Ex. 2f | | | 0.40% | 0% | <30% | 5.5 |
| Comp. Ex. 2g | | | 0.50% | 0% | <30% | 5.5 |
| Comp. Ex. 3a | — | Symic C604 | 0.25 | 100% | ≥80% | 0.4 |
| Comp. Ex. 3b | | | 0.50 | 100% | ≥80% | 0.7 |
| Comp. Ex. 3c | | | 0.75 | 100% | ≥80% | 1 |
| Comp. Ex. 3d | | | 1.00 | 100% | ≥80% | 1.4 |
| Ex. 3e | | | 1.25 | 100% | ≥80% | 1.6 |
| Ex. 3f | | | 1.50 | 100% | ≥80% | 1.9 |
| Ex. 3g | | | 1.75 | 100% | ≥80% | 2.2 |
| Ex. 3h | | | 2.00 | 100% | ≥80% | 2.4 |
| Ex. 3i | | | 3.00 | 98% | ≥80% | 3.3 |
| Ex. 3j | | | 5.00 | 98% | ≥80% | 4.8 |
| Ex. 3k | | | 10.00 | 96% | ≥80% | 5.2 |
| Comp. Ex. 4a | — | Symic B604 | 0.25 | 100% | ≥80% | 0.5 |
| Comp. Ex. 4b | | | 0.5 | 100% | ≥80% | 0.9 |
| Comp. Ex. 4c | | | 0.75 | 100% | ≥80% | 1.3 |
| Ex. 4d | | | 1.00 | 100% | ≥80% | 1.7 |
| Ex. 4e | | | 1.25 | 100% | ≥80% | 2 |
| Ex. 4f | | | 1.50 | 100% | ≥80% | 2.3 |
| Ex. 4g | | | 1.75 | 100% | ≥80% | 2.6 |
| Ex. 4h | | | 2.00 | 100% | ≥80% | 2.9 |
| Ex. 4i | | | 3.00 | 99% | ≥80% | 4 |
| Ex. 4j | | | 4.00 | 98% | ≥80% | 4.8 |
| Ex. 4k | | | 5.00 | 97% | ≥80% | 5.1 |
| Ex. 4l | | | 7.5 | 91% | ≥80% | 5.2 |
| Ex. 4m | | | 10.0 | 94% | ≥80% | 5.5 |
| Comp. Ex. 5a | — | Symic A604 | 0.25 | 100% | ≥80% | 0.6 |
| Comp. Ex. 5b | | Symic A604 | 0.50 | 100% | ≥80% | 1.3 |
| Ex. 5c | | | 0.75 | 100% | ≥80% | 1.7 |
| Ex. 5d | | | 1.00 | 100% | ≥80% | 2 |
| Ex. 5e | | | 1.25 | 100% | ≥80% | 2.7 |
| Ex. 5f | | | 1.50 | 100% | ≥80% | 3.3 |
| Ex. 5g | | | 1.75 | 99% | ≥80% | 3.4 |
| Ex. 5h | | | 2.00 | 100% | ≥80% | 4 |
| Ex. 5i | | | 3.00 | 98% | ≥80% | 5 |
| Ex. 5j | | | 5.00 | 98% | ≥80% | 5.5 |
| Ex. 5k | | | 10.00 | 99% | ≥80% | 5.5 |

The hiding behavior of the two different aluminum effect pigments is strikingly different: for Chromal V the sorting tests ale fulfilled only at extremely low concentrations (0.15%), whereas for the 2156 samples the concentration can be up to 1.0 wt. % to pass the sorting tests. The Chromal samples are much smaller and thinner yielding a larger number of particles per gram metal pigment. Also, they exhibit a broad particle size distribution (span) yielding a better hiding power compared to the other sample.

The three pearlescent effect pigments have no effect on the discharge behavior irrespective of their concentrations. The hiding power is largest for Symic A604 (Example 5 series), followed by the Symic B604 series (Example 4 series) and the Symic C604 (Example 3 series). This behavior can be attributed to the smaller particle sizes (the $D_{50}$-values increases within this series).

As smaller synthetic mica is obtained by milling also fractions of smaller particle sizes yield thinner particles. As the layer thickness of $TiO_2$ is the same (about 40 nm) for all samples the smallest and thinnest particles (A-series) will exhibit the highest $TiO_2$ content. As this high-refractive index layer is mainly responsible for the hiding power the smallest fractions have a high hiding power.

From these tests the possible highest concentrations for each aluminum pigment can be estimated. To work with these high concentrations, however, may lower the process stability as the plastic bodies may behave different in different shapes and also the sorting behavior may in reality differ from device to device. Therefore mixtures of the metal pigments with the pearlescent pigments are more favourable.

TABLE 3

Results for Mixtures of metal effect pigments and pearlescent pigments

| Sample | Metal Pigment and $C_M$ | Pearlescent pigment | Concentration $C_P$ and $c_p + t_{pl}$ Pearlescent pigm. [wt. %]/ [cm*wt. %] | Fraction of pixels PP in % (test 1) | Automatic sorting: discharge behaviour (test 2) | OD | Flop | $L^*_{15°}$ |
|---|---|---|---|---|---|---|---|---|
| Comp. Ex. 6 | 2156 1.0% | Symic B604 | 0.00% | 93% | ≥80% | 5.1 | 14.9 | 121.4 |
| Ex. 6a | | | 0.25%/ 0.05 | 98% | ≥80% | 5.5 | 15.0 | 121.4 |
| Ex. 6b | | | 0.50/ 0.10 | 92% | ≥80% | 5.5 | 15.2 | 121.6 |
| Ex. 6c | | | 1.00/ 0.20 | 91% | ≥80% | 5.5 | 15.4 | 120.7 |
| Ex. 6d | | | 2.00/ 0.40 | 99% | ≥80% | 5.5 | 15.5 | 121.5 |
| Ex. 6e | | | 3.00/ 0.60 | 80% | ≥80% | 5.5 | 15.6 | 122.3 |
| Comp. Ex. 6f | | | 5.00/ 1.00 | 30% | <30% | 5.5 | 15.5 | 124.6 |
| Comp. Ex. 7a | 2156 0.25% | Symic B604 | 0.00% | 98% | ≥80% | 1.6 | 13.9 | 119.3 |
| Ex. 7b | | | 0.25/ 0.05 | 98% | ≥80% | 2.2 | 14.4 | 118.3 |
| Ex.7c | | | 0.50/ 0.10 | 97% | ≥80% | 2.5 | 14.3 | 117.2 |
| Ex. 7d | | | 1.00/ 0.20 | 97% | ≥80% | 3.4 | 14.6 | 116.7 |
| Ex. 7e | | | 2.00%/ 0.40 | 97% | ≥80% | 4.7 | 15.3 | 118.4 |
| Ex. 7f | | | 3.00/ 0.60 | 97% | ≥80% | 5.5 | 15.7 | 120.0 |
| Ex. 7g | | | 5.00/ 1.00 | 96% | ≥80% | 5.5 | 16.0 | 122.6 |
| Comp. Ex. 8a | 2156 0.50% | Symic B604 | 0.00% | 98% | ≥80% | 3.2 | 14.6 | 120.8 |
| Ex. 8b | | | 0.25/ 0.050 | 96% | ≥80% | 3.5 | 14.8 | 120.1 |
| Ex. 8c | | | 0.50/ 0.10 | 97% | ≥80% | 4.0 | 14.9 | 119.6 |
| Ex. 8d | | | 1.00/ 0.20 | 97% | ≥80% | 4.8 | 15.1 | 119.4 |
| Ex. 8e | | | 2.00/ 0.40 | 96% | ≥80% | 5.5 | 15.4 | 119.9 |
| Ex. 8f | | | 3.00/ 0.60 | 97% | ≥80% | 5.5 | 15.8 | 121.0 |
| Ex. 8g | | | 5.00/ 1.00 | 96% | ≥80% | 5.5 | 15.7 | 122.9 |
| Comp. Ex. 9a | Chromal V 0.10% | Symic A604 | 0.00% | 98% | ≥80% | 2.6 | 11.5 | 104.9 |
| Ex. 9b | | | 0.25/ 0.050 | 99% | ≥80% | 3.3 | 12.1 | 106.0 |
| Comp. Ex. 9c | | | 0.50/ 0.10 | 98% | ≥80% | 3.9 | 12.6 | 107.1 |
| Ex. 9d | | | 1.00/ 0.20 | 98% | ≥80% | 4.3 | 12.9 | 107.4 |
| Ex. 9e | | | 2.00/ 0.40 | 98% | ≥80% | 4.8 | 13.4 | 108.2 |
| Ex. 9f | | | 3.00/ 0.60 | 98% | ≥80% | 5.5 | 13.8 | 109.6 |
| Ex. 9g | | | 5.00/ 1.00 | 99% | ≥80% | 5.5 | 14.4 | 111.6 |
| Ex. 9h | | | 0.25/ 0.050 | 99% | ≥80% | 5.5 | 15.0 | 114.1 |

TABLE 3-continued

Results for Mixtures of metal effect pigments and pearlescent pigments

| Sample | Metal Pigment and $C_M$ | Pearlescent pigment | Concentration $C_P$ and $c_p + t_{pl}$ Pearlescent pigm. [wt. %]/ [cm*wt. %] | Fraction of pixels PP in % (test 1) | Automatic sorting: discharge behaviour (test 2) | OD | Flop | $L^*_{15°}$ |
|---|---|---|---|---|---|---|---|---|
| Comp. Ex. 9i | | | 5.00/ 1.00 | Not measurable | <30% | 5.5 | 15.3 | 117.3 |
| Comp. Ex. 10a | Chromal V 0.15% | Symic A604 | 0.00% | 98% | ≥80% | 4.0 | 11.5 | 104.9 |
| Ex. 10b | Chromal V 0.15% | Symic A604 | 0.25/ 0.05 | 99% | ≥80% | 4.5 | 12.1 | 106.0 |
| Ex. 10c | | | 0.50/ 0.10 | 98% | ≥80% | 5.1 | 12.63 | 107.1 |
| Ex. 10d | | | 0.75/ 0.15 | 99% | ≥80% | 5.1 | 12.9 | 107.4 |
| Ex. 10e | | | 1.0/ 0.20 | 95% | ≥80% | 5.3 | 13.6 | 108.2 |
| Comp. Ex. 10f | | | 1.50/ 0.30 | 97% | <30% to <80% | 5.5 | 13.8 | 109.6 |
| Comp. Ex. 10g | | | 2.00/ 0.40 | Not measurable | 30% | 5.5 | 14.4 | 111.6 |
| Comp. Ex. 10h | | | 3.00/ 0.60 | Not measurable | <30% | 5.5 | 15.0 | 114.1 |

Discussion

For the silver dollar aluminum pigment 2156 the example series for lower metal pigment concentrations (0.25% for Examples series 7 and 0.50% for Examples series 8) show that the upper limit of adding pearlescent pigments at least of up to 5.0 wt. % do not hinder the sorting behavior and the identification of the polypropylene plastic by NIR spectroscopy. For the series with the upper limit of aluminum pigment (1.0 wt. %; Examples series 6) the discharge behavior was not passed at a pearlescent concentration of 5.0 wt. %, while it was passed for all lower concentrations. In all three series a slight increase of the flop compared to the samples without pearlescent pigments (Comp. Examples 6a, 7a and 8a) can be observed. Apparently, the addition of pearlescent pigments improves the flop behavior. The brightness $L^*_{15°}$ is not affected generally by the addition of pearlescent pigments. At higher concentrations of 3.0 wt. % or 5.0 wt. % an increase compared to the pure metal pigment can be seen whilst for lower concentrations the results are irregular. For the Examples series with the Chromal V pigment (Examples series 9 and 10) the critical concentrations of the metal pigment are much lower. The addition of pearlescent pigments leads to earlier fail of the sorting behavior. For both series, a range of pearlescent pigment concentrations can be identified wherein the sorting behavior is fine. In all cases the flop as well as the lightness were improved significantly by the addition of pearlescent pigments.

The invention claimed is:

1. Plastic part having a mean thickness $t_{pl}$ containing a mixture of effect pigments comprising flaky aluminum pigments in a concentration $c_{Al}$ and silvery, absorbing pearlescent pigments in a concentration $c_P$, wherein the flaky aluminum pigments are obtained by milling aluminum powder or aluminum-based alloy powder and i) for flaky aluminum pigments having a $D_{10} \geq 7.0$ µm: $c_{Al}*t_{pl}$ is in a range of 0.02 to 0.20 wt. % cm, or ii) for flaky aluminum pigments having a $D_{10} < 7.0$ µm: $c_{Al}*t_{pt}$ is in a range of 0.0020 to 0.030 wt. % cm, wherein each concentration refers in wt. % to the total weight of the uncoated plastic part.

2. The plastic part of claim 1, wherein the silvery, absorbing pearlescent pigments are selected from the group consisting of:

a) pearlescent pigments comprising a transparent substrate which is coated with a high-refractive index layer with n>1.8, which comprises an iron-oxide with Fe(II)-ions, b) pearlescent pigments comprising a transparent substrate which is coated with a high-refractive index layer with n>1.8, which comprises titanium suboxide or a pearlescent pigment comprising a substrate with a high-refractive index with n>1.8 layer, which comprises titanium suboxide that is optionally coated with a high-refractive index layer with n>1.8, c) pearlescent pigments comprising a transparent substrate which is coated with a high-refractive index layer with n>1.8, which comprises titanium oxynitride, d) pearlescent pigments comprising a transparent substrate which is coated with a layer comprising carbon, wherein the carbon is enclosed in a particulate form in another metal oxide layer or is formed as a separate, individual layer, e) a transparent substrate coated with a first layer comprising a mixture of the oxides of titanium, iron and at least one of cobalt and chromium and a second layer on the first layer, wherein the second layer comprises an oxide of titanium, and mixtures or combinations of the pearlescent pigments a) to e) or pearlescent pigments with mixtures or combinations of the various coating layers mentioned in the pearlescent pigments a) to e).

3. The plastic part of claim 1, wherein the flaky aluminum effect pigment has a $d_{50}$ in a range of 7.0 to 95.0 µm, preferably in a range of 8.0 to 40.0 µm.

4. The plastic part of claim 1, wherein the flaky aluminum effect pigments of type i) have a mean thickness $h_{Al}$ in a range of 100 to 350 nm or/and wherein the flaky aluminum effect pigments of type ii) have a mean thickness $h_{Al}$ in a range of 80 to 170 nm.

5. The plastic part of claim 1, wherein for flaky aluminum effect pigments of type i) $c_{Al}*t_{pl}$ is in a range of 0.040 to 0.180 wt. % cm or for flaky aluminum effect pigments of type ii) $c_{Al}*t_{pl}$ is in a range of 0.008 to 0.026 wt. % cm.

6. The plastic part of claim 1, wherein the product of $t_{pl}$ with the concentration of silvery, absorbing pearlescent pigment $c_P$ is:

I. for the case that $c_{Al}*t_{pl}$=0.000 cm wt. %, 0.40 cm wt. %≤$c_P*t_{pl}$<about 2.0 cm wt. %, or II. for the aluminum effect pigments being of type i):

$$0.02\text{ cm }wt.\ \% \le c_{Al}*t_{pl} \le 0.05\text{ cm }wt.\ \%, \quad \alpha)$$

$$0.10\text{ cm }wt.\ \% \le c_P*t_{pl} \le \text{about }1.0\text{ cm }wt.\ \%,$$

$$0.05\text{ cm }wt.\ \% < c_{Al}*t_{pl} \le 0.10\text{ cm }wt.\ \%, \quad \beta)$$

$$0.050\text{ cm }wt \le c_P*t_{pl} \le \text{about }1.0\text{ cm }wt.\ \%,$$

$$0.10\text{ cm }wt.\ \% < c_{Al}*t_{pl} \le 0.20\text{ cm }wt.\ \%, \quad \gamma)$$

$$0.02\text{ cm }wt.\ \% < c_P*t_{pl} \le \text{about }0.80\text{ cm }wt.\ \%,$$

or

III. for the aluminum effect pigments being of type ii):

$$0.002\text{ cm }wt.\ \% \le c_{Al}*t_{pl} \le 0.020\text{ cm }wt.\ \%, \quad \delta)$$

$$0.10\text{ cm }wt.\ \% \le c_P*t_{pl} \le \text{about }0.80\text{ cm }wt.\ \%,$$

$$0.020\text{ cm }wt.\ \% < c_{Al}*t_{pl} \le 0.030\text{ cm }wt.\ \%, \quad \varepsilon)$$

$$0.020\text{ cm }wt \le c_P*t_{pl} \le \text{about }0.30\text{ cm }wt.\ \%.$$

7. The plastic part of claim 1, wherein the product of $t_{pl}$ with the concentration of silvery, absorbing pearlescent pigment cp is:

I. for the case that $c_{Al}*t_{pl}$=0.00 cm wt. %, 0.40 cm*wt. %≤$c_P*t_{pl}$<about 2.0 cm wt. %, or II. for the aluminum effect pigments being of type i):

$$0.04\text{ cm }wt.\ \% \le c_{Al}*t_{pl} \le 0.05\text{ cm }wt.\ \%, \quad \alpha)$$

$$0.30\text{ cm }wt.\ \% \le c_P*t_{pl} \le \text{about }1.0\text{ cm }wt.\ \%,$$

$$0.06\text{ cm }wt.\ \% < c_{Al}*t_{pl} \le 0.10\text{ cm }wt.\ \%, \quad \beta)$$

$$0.050\text{ cm }wt \le c_P*t_{pl} \le \text{about }0.80\text{ cm }wt.\ \%,$$

$$0.10\text{ cm }wt.\ \% < c_{Al}*t_{pl} \le 0.20\text{ cm }wt.\ \%, \quad \gamma)$$

$$0.02\text{ cm }wt.\ \% < c_P*t_{pl} \le \text{about }0.70\text{ cm }wt.\ \%,$$

or

III. for the aluminum effect pigments being of type ii):

$$0.04\text{ cm }wt.\ \% \le c_{Al}*t_{pl} \le 0.020\text{ cm }wt.\ \%, \quad \delta)$$

$$0.12\text{ cm }wt.\ \% \le c_P*t_{pl} \le \text{about }0.80\text{ cm }wt.\ \%,$$

$$0.020\text{ cm }wt.\ \% < c_{Al}*t_{pl} \le 0.030\text{ cm }wt.\ \%, \quad \varepsilon)$$

$$0.080\text{ cm }wt \le c_P*t_{pl} \le \text{about }0.260\text{ cm }wt.\ \%.$$

8. The plastic part of claim 1, wherein the optical density OD of the plastic part is ≥1.5.

9. The plastic part of claim 1, wherein the aluminum effect pigment is coated with a metal oxide which is selected from the group consisting of $SiO_2$, Ce-oxide, Mo-oxide, V-oxide, Cr-oxide and mixtures or combinations thereof.

10. The plastic part of claim 1, wherein the silvery pearlescent pigments are selected from the group consisting of:

a) pearlescent pigments of type a), wherein the pearlescent pigment has a coating comprising a metal oxide layer comprising Ti- and Fe-ions, wherein the Fe-ions are mainly Fe(II) ions, which is preferably an ilmenite ($FeTiO_3$) layer, magnetite ($Fe_3O_4$) or mixtures thereof, b) pearlescent pigments of type b), wherein the titanium suboxide can be represented by the formula $$Ti_nO_{2n-1} \quad (III)$$

wherein n in an integer of 1 to 10, c) pearlescent pigments of type c), wherein the titanium oxynitride can be represented by the formula $$Ti_xN_yO_z \quad (IV)$$

wherein x is 0.2 to 0.6, y is 0.05 to 0.6 and z is 0.1 to 0.9, which comprises a solid solution of nitrogen in titanium monoxide, and mixtures or combinations of the pearlescent pigments a) to c) or pearlescent pigments with mixtures or combinations of the various coating layers mentioned in the pearlescent pigments a) to c).

11. The plastic part of claim 1, wherein the silvery pearlescent pigment is of type a) and comprises the following structure:

(a) a transparent platelet-shaped synthetic substrate, (b) a titanium oxide layer, followed by (c) a metal oxide layer comprising Ti- and Fe-ions, wherein the Fe-ions are mainly Fe(II)-ions.

12. The plastic part of claim 1, wherein the plastic material is selected from the group consisting of polypropylene (PP high density polyethylene (HDPE), low density polyethylene (LDPE), linear low-density polyethylene (LLDPE), polyethylene terephthalate (PET), polystyrene (PS), polyurethane (PUR), polyacrylate, polyamide (PA) or nylons, polyvinylchloride (PVC), polycarbonate (PC) and ABS/MABS.

13. The plastic part of claim 1 further comprising at least one of additives, fillers, conventional color pigments, and additional pearlescent pigments, which are not silvery absorbing pearlescent pigments.

14. The plastic part of claim 1, wherein the total amount of the effect pigments of the effect pigment mixture, optional additional pearlescent pigments and optional additional conventional pigments is equal to or less than 10.0 wt %, based on the total weight of the plastic part.

15. The plastic part of claim 1, wherein the mean thickness $t_{pl}$ is in a range of 50 μm to 5 mm.

16. The plastic part of claim 1, wherein the flaky aluminum pigments of type i) have a $D_{10}$ value in the range of 7.0 μm to 12.0 μm.

17. The plastic part of claim 1, wherein the part is manufactured by extrusion, calendaring, cast-film molding, blown-film molding, blow molding, roto molding, injection molding, injection blow molding, injections stretch blow molding, preform stretch blow molding, pressing, thermoforming, fused deposition modelling, fused filament fabrication, fluidized bed coating or laser sintering.

* * * * *